United States Patent
Kim et al.

(10) Patent No.: US 9,986,166 B2
(45) Date of Patent: May 29, 2018

(54) PORTABLE DEVICE INCLUDING A FLIP COVER AND METHOD OF CONTROLLING THEREFOR

(71) Applicant: LG ELECTRONICS INC., Seoul (KR)

(72) Inventors: Jongho Kim, Seoul (KR); Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/112,414

(22) PCT Filed: Apr. 14, 2014

(86) PCT No.: PCT/KR2014/003175
§ 371 (c)(1),
(2) Date: Jul. 18, 2016

(87) PCT Pub. No.: WO2015/115700
PCT Pub. Date: Aug. 6, 2015

(65) Prior Publication Data
US 2016/0337595 A1    Nov. 17, 2016

(30) Foreign Application Priority Data

Jan. 28, 2014  (KR) .................. 10-2014-0010249

(51) Int. Cl.
*H04N 5/232*    (2006.01)
*G06F 3/14*    (2006.01)
(Continued)

(52) U.S. Cl.
CPC ....... *H04N 5/23293* (2013.01); *G06F 1/1677* (2013.01); *G06F 1/1694* (2013.01);
(Continued)

(58) Field of Classification Search
CPC ........... H04N 5/23293; H04N 5/23245; H04N 5/23216; G06F 1/1694; G06F 1/3262;
(Continued)

(56) References Cited

U.S. PATENT DOCUMENTS

| | | | |
|---|---|---|---|
| 7,126,626 B2 * | 10/2006 | Sawahara | H04N 5/23293 348/14.02 |
| 2007/0052832 A1 * | 3/2007 | Bae | H04N 5/23293 348/333.12 |

(Continued)

FOREIGN PATENT DOCUMENTS

KR    10-1212132    12/2012

OTHER PUBLICATIONS

PCT International Application No. PCT/KR2014/003175, Written Opinion of the International Searching Authority dated Oct. 21, 2014, 10 pages.

*Primary Examiner* — Gevell Selby
(74) *Attorney, Agent, or Firm* — Lee Hong Degerman Kang Waimey (57) ABSTRACT

A method of controlling a portable device including a flip cover for covering a display unit according to one embodiment of the present specification includes the steps of detecting that the portable device operates in a standby mode and the flip cover is positioned in a closed position, wherein the flip cover contains an open window and wherein the open window exposes a first part of the display unit when the flip cover is positioned in a closed position, sensing an orientation of the portable device, detecting a first control input, when the orientation of the portable device corresponds to a first orientation, displaying predetermined information in the first part of the display unit and when the orientation of the portable device corresponds to a second orientation, activating the camera unit in response to the first
(Continued)

control input and displaying a first preview image of the digital image sensed by the camera unit in the first part of the display unit.

20 Claims, 10 Drawing Sheets (51) Int. Cl.
    *G06F 1/16*     (2006.01)
    *G06F 1/32*     (2006.01)
(52) U.S. Cl.
    CPC .............. *G06F 1/3262* (2013.01); *G06F 3/14* (2013.01); *H04N 5/23216* (2013.01); *H04N 5/23245* (2013.01); *G06F 2200/1634* (2013.01); *G06F 2200/1637* (2013.01)

(58) Field of Classification Search
    CPC .. G06F 1/1677; G06F 3/14; G06F 2200/1634; G06F 2200/1637
    See application file for complete search history.

(56) References Cited

U.S. PATENT DOCUMENTS

| | | | |
|---|---|---|---|
| 2011/0298887 A1* | 12/2011 | Maglaque | H04N 5/232 348/14.16 |
| 2012/0019704 A1 | 1/2012 | Levey | |
| 2013/0113731 A1 | 5/2013 | Yoo et al. | |
| 2013/0162684 A1 | 6/2013 | Williams | |
| 2014/0009498 A1 | 1/2014 | Bismilla | |
| 2014/0198070 A1* | 7/2014 | Won | G06F 3/017 345/173 |
| 2014/0274217 A1* | 9/2014 | Lee | H04M 1/0266 455/566 |
| 2016/0337581 A1* | 11/2016 | Wang | H04N 5/232 |

\* cited by examiner

[Fig. 1]

front side　　　backside
standby mode active mode

PORTABLE DEVICE INCLUDING A FLIP COVER AND METHOD OF CONTROLLING THEREFOR

CROSS-REFERENCE TO RELATED APPLICATIONS

This application is the National Stage filing under 35 U.S.C. 371 of International Application No. PCT/KR2014/003175, filed on Apr. 14, 2014, which claims the benefit of earlier filing date and right of priority to Korean Patent Application No. 10-2014-0010249, filed on Jan. 28, 2014, the contents of which are all hereby incorporated by reference herein in their entirety.

TECHNICAL FIELD

The present specification relates to a portable device, and more particularly, to a method of controlling a camera of a portable device including a flip cover.

BACKGROUND ART

As a portable device including a display unit exposed to an external is disseminated, users put a flip cover on the portable device to protect the display unit. The flip cover protects the display unit of the portable device from an external shock in a closed position.

Yet, in order for a user to control the portable device using the display unit, there exist inconvenience of touching the display unit after the flip cover is moved to an open position.

DISCLOSURE OF INVENTION

Technical Problem

The present specification intends to provide a portable device including a flip cover and a method of controlling therefor. In particular, the present specification intends to provide a method of controlling a portable device in case that the flip cover is in a closed position.

Solution to Problem

To achieve these and other advantages and in accordance with the purpose of the present specification, as embodied and broadly described, according to one embodiment, a portable device includes a camera unit configured to sense a digital image, a display unit configured to display the digital image, a cover sensor unit configured to sense whether a flip cover is opened or not, wherein the flip cover includes an open window and wherein the open window exposes a first part of the display unit when the flip cover is positioned in a closed position, an orientation sensor unit configured to sense an orientation of the portable device, and a controller configured to control the camera unit, the display unit, the cover sensor unit, and the orientation sensor unit, if the portable device operates in a standby mode and the flip cover is positioned in the closed position, the controller configured to detect a first control input, if the orientation of the portable device corresponds to a first orientation, the controller configured to display predetermined information in the first part of the display unit, if the orientation of the portable device corresponds to a second orientation, the controller configured to activate the camera unit in response to the first control input and display a first preview image of the digital image sensed by the camera unit in the first part of the display unit.

To further achieve these and other advantages and in accordance with the purpose of the present specification, according to one embodiment, a method of controlling a portable device including a flip cover for covering a display unit includes the steps of detecting that the portable device operates in a standby mode and the flip cover is positioned in a closed position, wherein the flip cover includes an open window and wherein the open window exposes a first part of the display unit when the flip cover is positioned in a closed position, sensing an orientation of the portable device, detecting a first control input, if the orientation of the portable device corresponds to a first orientation, displaying predetermined information in the first part of the display unit, and if the orientation of the portable device corresponds to a second orientation, activating the camera unit in response to the first control input and displaying a preview image of the digital image sensed by the camera unit in the first part of the display unit.

It is to be understood that both the foregoing general description and the following detailed description are exemplary and explanatory and are intended to provide further explanation of the invention as claimed.

Advantageous Effects of Invention

According to the present specification, a portable device can activate a camera unit via a control input in a standby mode.

According to the present specification, a portable device can activate a camera unit via a control input in case that a flip cover is in a closed position as well.

According to the present specification, a portable device can display a preview image of a digital image sensed by a camera unit via an open window of a flip cover.

According to the present specification, a portable device senses an orientation and can activate or deactivate a camera unit for an identical control input according to the sensed orientation.

According to the present specification, a portable device can display a preview image in a manner of resizing or cropping a digital image sensed by a camera unit.

According to the present specification, a portable device can display preview images different from each other according to whether a flip cover is opened or closed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

While the embodiments have been explained in detail with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device may correspond to a device including a camera unit and a display unit. For instance, the portable device may include a smartphone, a smart pad, a notebook, a tablet computer, or a music player.

Figure 1:
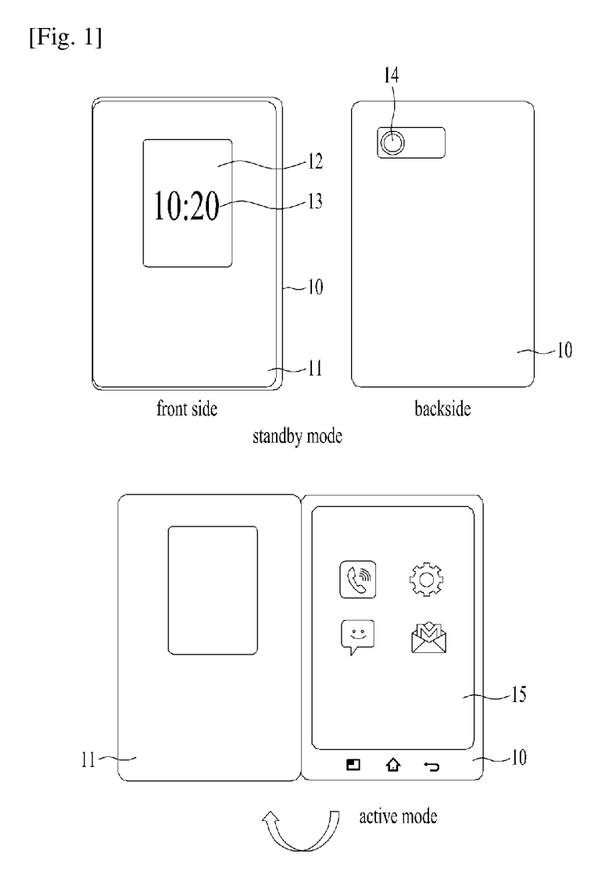
FIG. 1 is a diagram of a portable device according to one embodiment of the present specification.

FIG. 1 is a diagram of a portable device according to one embodiment of the present specification. The portable device 10 can change a mode according to whether a flip cover 11 is opened or closed. If the flip cover 11 is in a closed position, the portable device 10 can operate in a standby mode. And, if the flip cover 11 is in an open position, the portable device can operate in an active mode. The flip cover 11 can be attached to the portable device 10 with a removable form.

Referring to the top of FIG. 1, a front side of the portable device 10 can be covered with the flip cover 11. A position of the flip cover 11 covering the portable device 10 can be defined as a closed position. The flip cover 11 can include an open window 12. The open window 12 can expose a part of a display unit among the display unit of the portable device covered with the flip cover to an external. In particular, among the display unit of the portable device, a part corresponding to the open window 12 of the flip cover can be provided to a user even in case that the flip cover 11 is in the closed position. In case that the flip cover 11 is in the closed position, the portable device 10 can operate in a standby mode. The portable device 10 can maintain a deactivated state of the display unit in the standby mode. And, according to embodiment, the portable device 10 can selectively activate the display unit corresponding to the open window 12 in the standby mode. The portable device 10 can display predetermined information 13 using a display area corresponding to the open window 12. In this case, the predetermined information 13 can include information on current time. The portable device 10 can include a camera unit 14 in a rear side. And, the portable device 10 can limitedly activate a touch sensor on a part of the display unit corresponding to the open window in the standby mode. In particular, the portable device can limit a touch sensitive area of the display unit to a part corresponding to the open window.

The bottom of FIG. 1 is a diagram of the portable device 10 of which the flip cover is moved to an open position. When the flip cover 11 is moved to the open position, the portable device 10 can switch to an active mode from the standby mode. The portable device 10 can activate the display unit 15 and display visual information in the active mode.

Figure 2:
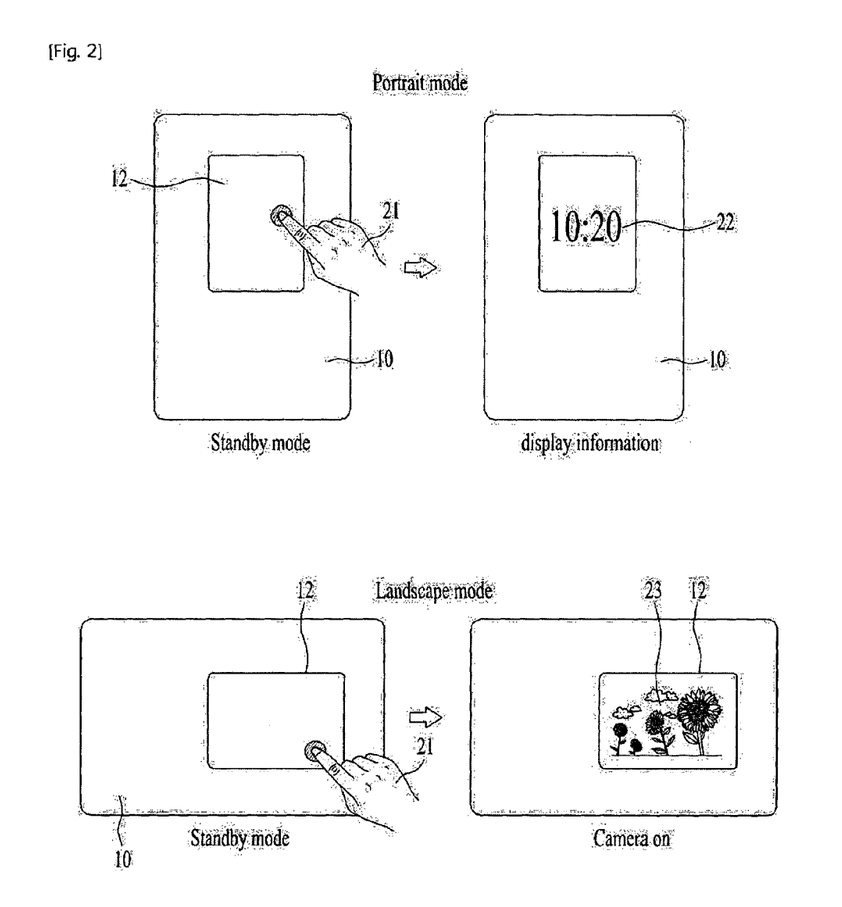
FIG. 2 is a diagram of a method for a portable device according to one embodiment of the present specification to activate a camera unit in a standby mode.

FIG. 2 is a diagram of a method for a portable device according to one embodiment of the present specification to activate a camera unit in a standby mode. The portable device 10 can detect an orientation of the portable device. Having detected an identical control input in the standby mode, the portable device 10 can differently operate according to the orientation.

Referring to the top of FIG. 2, the portable device 10 can sense a first orientation in the standby mode. In this case, the first orientation can be defined as an orientation sensed in case that the portable device 10 is gripped in a vertical direction. In the following description, a portable device, which has sensed the first orientation, can be represented as the portable device in a portrait mode.

If the first orientation is sensed and a first control input 21 is detected in the standby mode, the portable device 10 can display predetermined information 22. The portable device 10 can detect the first control input 21 via an area exposed to an external by the open window 12 among the display unit of the portable device. And, according to embodiment, the portable device 10 can detect the first control input using at least one selected from the group consisting of a physical button, a display unit, a microphone, and a sensor unit included in the portable device. The first control input 21 may correspond to a touch input touching the portable device or an input patting the portable device twice. And, the first control input may include a gesture input or an audio input according to embodiment.

Having sensed the first orientation, the portable device can operate in the portrait mode. If the first control input 21 is detected in the portrait mode, the portable device 10 can display the predetermined information 22. The predetermined information 22 may include at least one selected from the group consisting of information on current time, quick control information for executing an application, and user information. The predetermined information 22 can be displayed in a display area corresponding to the open window 12. In particular, although the flip cover is positioned in the closed position, the portable device 10 can provide the information displayed in the display unit to a user via the open window 12.

Referring to the bottom of FIG. 2, the portable device 10 can sense a second orientation in the standby mode. In this case, the second orientation can be defined as an orientation sensed in case that the portable device 10 is gripped in a horizontal direction. In the following description, a portable device, which has sensed the second orientation, can be represented as the portable device in a landscape mode.

If the second orientation is sensed and a first control input 21 is detected in the standby mode, the portable device 10 can activate a camera unit. The portable device 10 can detect the first control input 21 via an area exposed to an external by the open window 12 among the display unit of the portable device. And, according to embodiment, the portable device 10 can detect the first control input using at least one selected from the group consisting of a physical button, a display unit, a microphone, and a sensor unit included in the portable device. The first control input 21 may correspond to a touch input touching the portable device or an input patting the portable device twice. And, the first control input may include a gesture input or an audio input according to embodiment. As mentioned in the foregoing description, the portable device 10 can directly activate the camera unit by the first control input 21 only in the standby mode. In particular, a user can take a picture of a digital image by activating the camera in a state that the flip cover is positioned in the closed position.

Having sensed the second orientation, the portable device 10 can operate in the landscape mode. If the first control input 21 is detected in the landscape mode, the portable device 10 can activate the camera unit. The portable device can display a preview image of a digital image sensed by the camera unit. The portable device 10 can display the preview image in a display area corresponding to the open window 12. In particular, although the flip cover is positioned in the closed position, the portable device 10 can provide the preview image displayed in the display unit to a user via the open window 12. The portable device 10 can display the digital image sensed by the camera unit as the preview image in a manner of cropping or resizing the digital image. In case of displaying a cropped preview image, the portable device 10 can take a picture after increasing a resolution value set to the camera unit. By doing so, in case of taking a picture of a digital image corresponding to a cropped preview image, the portable device 10 can store the digital image without a deterioration of resolution.

As mentioned in the foregoing description, the portable device 10 according to the present specification can differently operate according to whether the portable device operates in the portrait mode or the landscape mode although an identical control input is detected by the portable device. In particular, if the portable device 10 detects the control input in the portrait mode, the portable device displays information and if the portable device detects the control input in the landscape mode, the portable device activates the camera unit and can take a picture of a digital image. By doing so, although the flip cover is positioned in the closed position, the portable device 10 can immediately take a picture. In particular, a user can take a picture of a digital image without opening the flip cover of the portable device 10.

Figure 3:
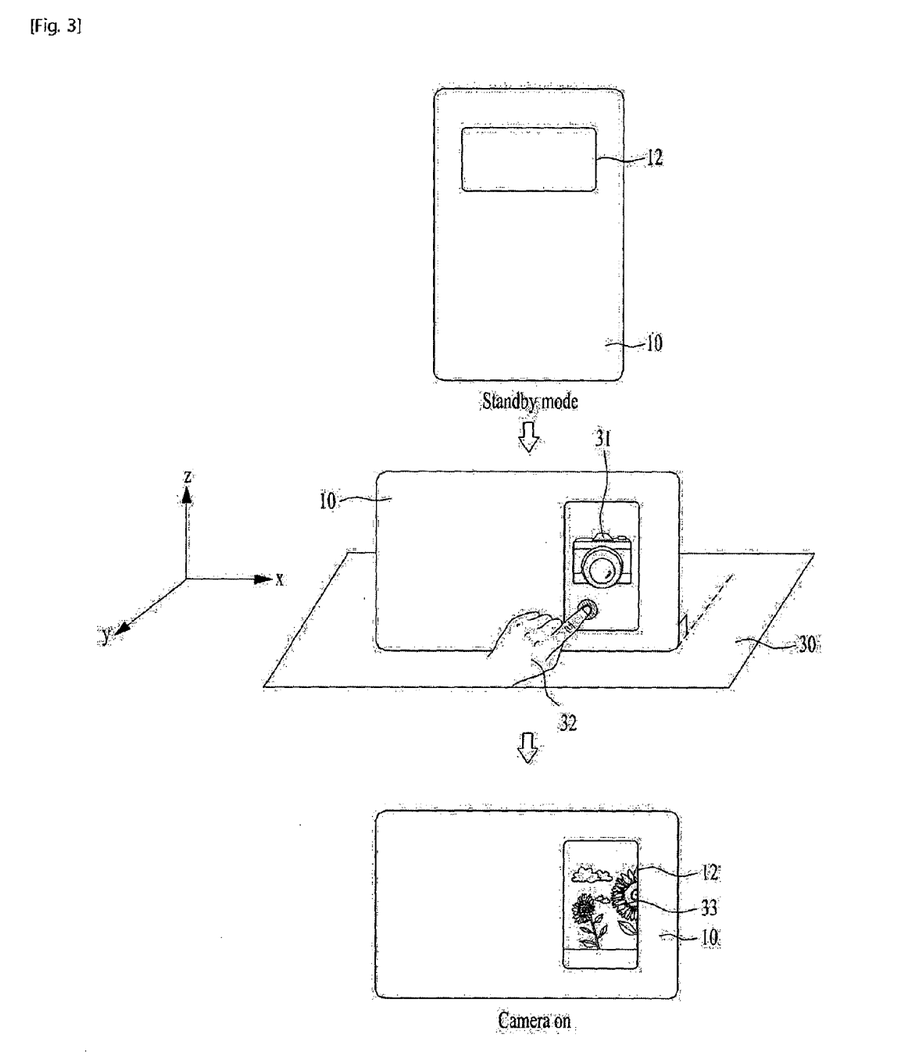
FIG. 3 is a diagram of steps of activating a camera unit of a portable device according to one embodiment of the present specification.

FIG. 3 is a diagram of steps of activating a camera unit of a portable device according to one embodiment of the present specification. Having detected that an orientation of the portable device corresponds to a second orientation and the portable device is practically erected in z axis direction or a gravity orientation, the portable device 10 can display an indicator 31 for activating the camera unit. In this case, it may assume that a horizontal plane corresponds to a xy plane 30. The portable device can indicate a user that the camera unit can be activated in a manner of displaying the indicator. The portable device 10 can display the indicator in a display area corresponding to the open window 12 of the flip cover.

If a control input 32 for the indicator 31 is detected, the portable device 10 can activate the camera unit. In this case, the control input 32 for the indicator 31 may include an input for touching or knocking the display area corresponding to the displayed indicator 31 or the open window 12. And, the control input 32 for the indicator 31 may include a gesture input or an audio input inputted in a state that the indicator 31 is displayed.

If the camera unit is activated, the portable device 10 can display a preview image 33 in a display area corresponding to the open window 12. The preview image 33 may correspond to a preview image of a digital image activated via the camera unit. A user checks the preview image displayed in the open window by vision and can take a picture of a digital image with a preferred composition.

As mentioned in the foregoing description, having detected that the portable device is in the landscape mode and the portable device is erected in a vertical direction to a horizontal plane, the portable device can display an indicator indicating a state capable of activating the camera unit. If a control input for the indicator is detected, the portable device 10 can activate the camera unit in the standby mode. According to embodiment, having detected that the portable device is in the landscape mode and is erected in the direction vertical to the horizontal plane, the portable device 10 bypasses the operation of displaying the indicator and may immediately activate the camera unit.

According to embodiment, the portable device senses a gravity orientation via an orientation sensor unit and can activate the camera unit only when an angle between the display unit of the portable device and the gravity orientation is within an angle threshold. And, after the camera unit is activated, the portable device can maintain the state that the camera unit is activated although the angle between the display unit and the gravity orientation exceeds the angle threshold.

Moreover, according to embodiment, the portable device can further include a distance sensor unit configured to measure a separation distance between the portable device and an external object. The portable device further measures the separation distance between the portable device and the external object and can activate the camera unit only when the separation distance is greater than a distance threshold. By doing so, the portable device can maintain a deactivated state of the camera when it is difficult to take a picture of a digital image despite the activation of the camera since the external object is positioned in the vicinity of the portable device.

Figure 4:
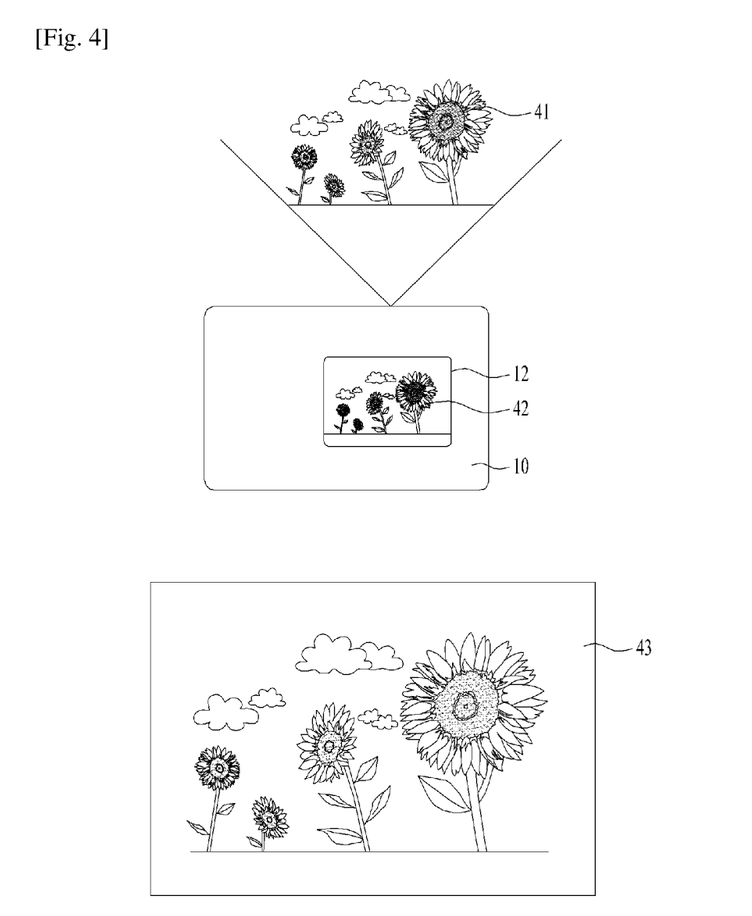
FIG. 4 is a diagram of a method for a portable device according to one embodiment of the present specification to take a picture of a digital image.

FIG. 4 is a diagram of a method for a portable device according to one embodiment of the present specification to take a picture of a digital image. The portable device 10 can display a preview image based on a shape or a size of the open window.

The portable device 10 can take a picture of an external object 41 using the camera unit. As mentioned earlier in FIG. 2 to FIG. 3, the portable device 10 can detect a first control input and activate the camera unit in a state that the flip cover is positioned in a closed position. The portable device 10 can display a preview image 42 of a digital image sensed via the activated camera unit in a display area corresponding to the open window 12. The portable device 10 can display the preview image 42 in the display area corresponding to a shape or a size of the open window 12. As depicted in FIG. 4, in case that a horizontal axis of the open window 12 is longer than a vertical axis of the open window 12 in the landscape mode, the portable device 10 can display the preview image 42 of which the sensed digital image is resized. If a control input for indicating a capturing is detected in a state that the resized preview image 42 is displayed, the portable device 10 can store a whole area sensed by the camera unit. In particular, the portable device can store a digital image 43 including a composition identical to the preview image. By doing so, a user can checks the digital image captured and stored via the preview image 42 displayed in the display area corresponding to the open window 12 although the flip cover is positioned in the closed position. In this case, the portable device can store a digital image of which a horizontal axis is longer than a vertical axis.

Although it is not depicted in FIG. 4, if the vertical axis of the open window 12 is longer than the horizontal axis of the open window 12 in the portrait mode, the portable device 10 can display a preview image of which a sensed digital image is resized. If a control input for indicating a capturing is detected in a state that the resized preview image is displayed, the portable device 10 can store a whole area sensed by the camera unit. In particular, the portable device can store a digital image including a composition identical to the preview image. By doing so, a user can checks the digital image captured and stored via the preview image displayed in the display area corresponding to the open window although the flip cover is positioned in the closed position. In this case, the portable device can store a digital image of which a vertical axis is longer than a horizontal axis.

Figure 5:
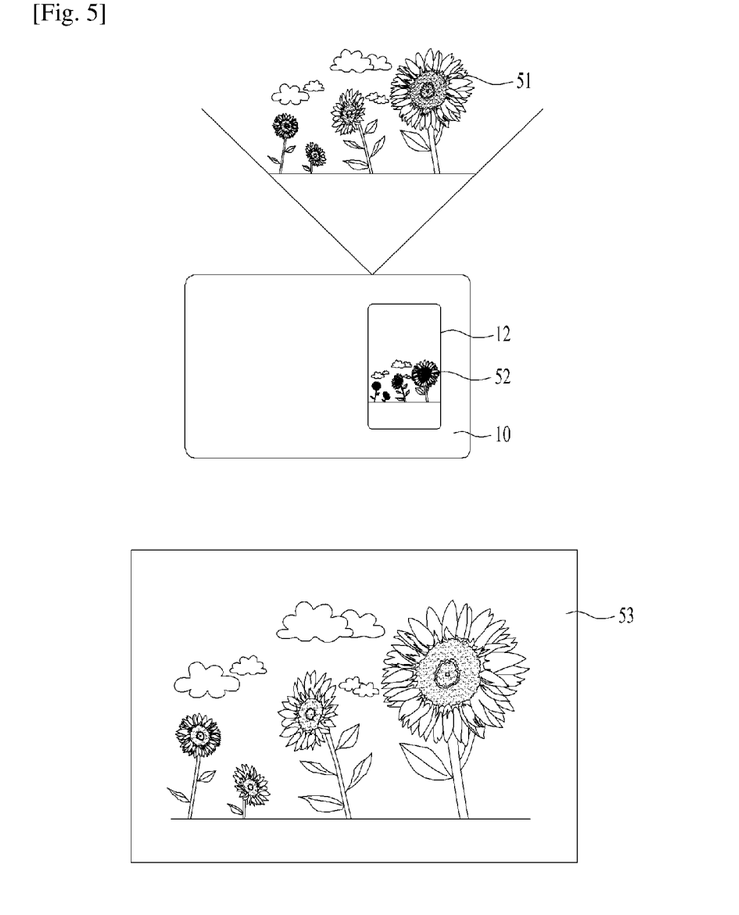
FIG. 5 is a diagram of a method for a portable device according to a different embodiment of the present specification to take a picture of a digital image.

FIG. 5 is a diagram of a method for a portable device according to a different embodiment of the present specification to take a picture of a digital image. The portable device 10 can display a preview image based on a shape or a size of the open window.

The portable device 10 can take a picture of an external object 51 using the camera unit. As mentioned earlier in FIG. 2 to FIG. 3, the portable device 10 can detect a first control input and activate the camera unit in a state that the flip cover is positioned in a closed position. The portable device 10 can display a preview image 52 of a digital image sensed via the activated camera unit in a display area corresponding to the open window 12. The portable device 10 can display the preview image 52 in the display area corresponding to a shape or a size of the open window 12. As depicted in FIG. 5, in case that a vertical axis of the open window 12 is longer than a horizontal axis of the open window 12 in the landscape mode, the portable device 10 can display the preview image 52 of which the sensed digital image is resized. If a control input for indicating a capturing is detected in a state that the resized preview image 52 is displayed, the portable device 10 can store a whole area sensed by the camera unit. In particular, the portable device can store a digital image 53 including a composition identical to the preview image. By doing so, a user can checks the digital image captured and stored via the preview image 52 displayed in the display area corresponding to the open window 12 although the flip cover is positioned in the closed position. In this case, the portable device can store a digital image of which a horizontal axis is longer than a vertical axis. If the vertical axis of the open window 12 is longer than the horizontal axis of the open window in the landscape mode, the portable device 10 can display a preview image reduced by a ratio greater than the ratio of the case that the horizontal axis is longer than the vertical axis. In particular, in taking a picture in the landscape mode, the portable device 10 sets a resizing ratio higher when a shape of the open window corresponds to a rectangle where a vertical line is longer than a horizontal line compared to when the shape of the open window corresponds to a rectangle where a horizontal line is longer than a vertical line and can display the preview image smaller. By doing so, the portable device can display a whole area of the digital image sensed by the camera unit in an area corresponding to the open window as a preview image.

Figure 6:
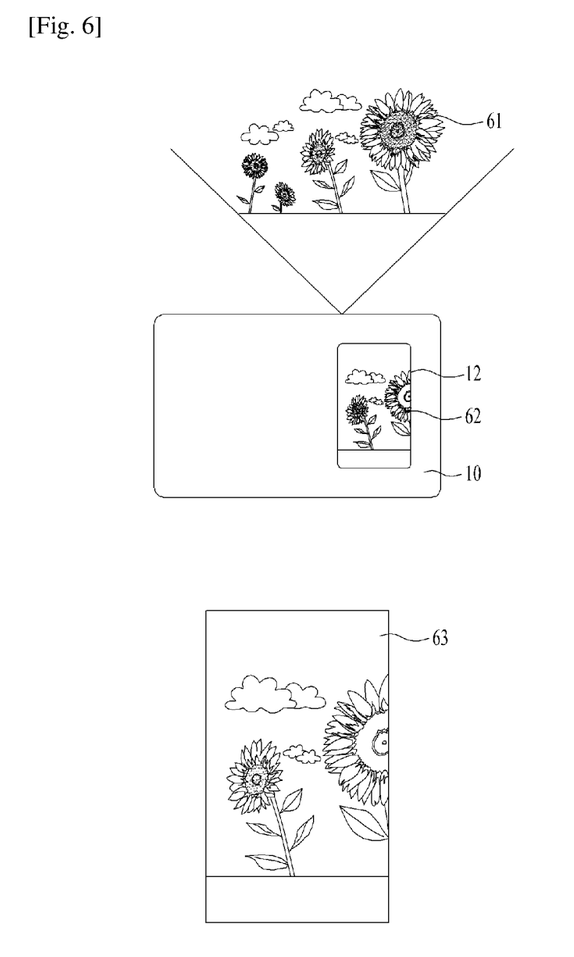
FIG. 6 is a diagram of a method for a portable device according to a different embodiment of the present specification to take a picture of a digital image.

FIG. 6 is a diagram of a method for a portable device according to a different embodiment of the present specification to take a picture of a digital image. The portable device 10 can display a preview image based on a shape or a size of the open window.

The portable device 10 can take a picture of an external object 61 using the camera unit. As mentioned earlier in FIG. 2 to FIG. 3, the portable device 10 can detect a first control input and activate the camera unit in a state that the flip cover is positioned in a closed position. The portable device 10 can display a preview image 62 of a digital image sensed via the activated camera unit in a display area corresponding to the open window 12. The portable device 10 can display the preview image 62 in the display area corresponding to a shape or a size of the open window 12. As depicted in FIG. 6, in case that a vertical axis of the open window 12 is longer than a horizontal axis of the open window 12 in the landscape mode, the portable device 10 can display the preview image 62 of which the sensed digital image is cropped. If a control input for indicating a capturing is detected in a state that the cropped preview image 62 is displayed, the portable device 10 can selectively store a part of area among the digital image sensed by the camera unit. In particular, the portable device can store a digital image 63 including a composition identical to the preview image 62. In other word, the portable device can crop and store the digital image sensed by the camera unit based on the preview image. By doing so, a user can checks the digital image captured and stored via the preview image 62 displayed in the display area corresponding to the open window 12 although the flip cover is positioned in the closed position. In this case, the portable device can store a digital image of which a vertical axis is longer than a horizontal axis. In case of selectively cropping and storing a part of the area of the digital image sensed by the camera unit, the portable device can take a picture of the external object 61 with a resolution higher than a configured resolution. By doing so, the portable device 10 can prevent the resolution of the cropped and stored image from being deteriorated. Consequently, the portable device can take a picture of a portrait image in the landscape mode with a resolution identical to that of the portrait mode. In particular, although the portable device senses a digital image of which a horizontal line is longer than a vertical line via the camera unit, a digital image to be stored may correspond to an image of which a vertical line is longer than a horizontal line.

Figure 7:
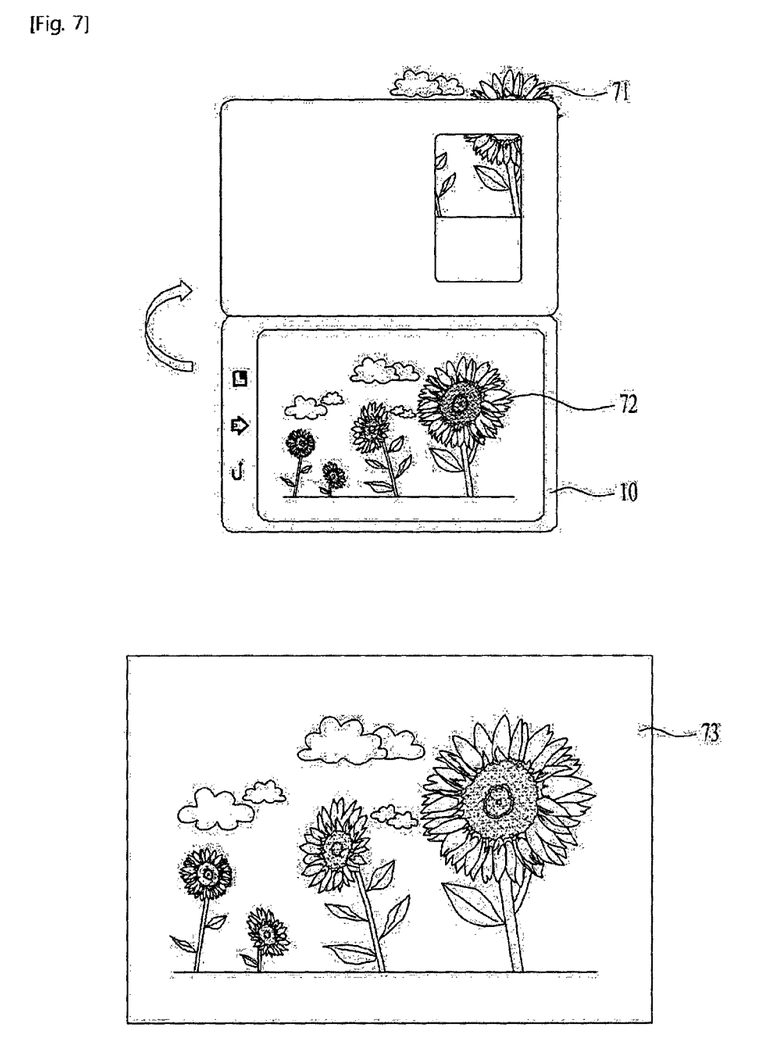
FIG. 7 is a diagram for a method of taking a picture of a digital image in case that a flip cover of a portable device according to one embodiment of the present specification is in an open position.

FIG. 7 is a diagram for a method of taking a picture of a digital image in case that a flip cover of a portable device according to one embodiment of the present specification is in an open position. If the flip cover moves from a closed position to an open position, the portable device 10 can display a preview image in a whole of the display area.

The portable device 10 can take a picture of an external object 71 using the camera unit. As mentioned earlier in FIG. 4 to FIG. 6, the portable device 10 can detect a first control input and activate the camera unit in a state that the flip cover is positioned in a closed position. The portable device 10 can display a preview image of a digital image sensed via the activated camera unit in a display area corresponding to the open window. The portable device 10 can display the preview image in the display area corresponding to a shape or a size of the open window. As depicted in FIG. 7, if the flip cover moves from the closed position to the open position, the portable device 10 can display the preview image 72 of the digital image sensed by the camera unit in the display area. When the flip cover is positioned in the closed position, the portable device 10 displays the preview image in a selective display area corresponding to the open window. On the contrary, if the flip cover is positioned in the open position, the portable device 10 can display the preview image 71 in the whole of the display area.

Hence, the preview image displayed in case that the flip cover is in the closed position and the preview image displayed in case that the flip cover is in the open position may be different from each other in terms of at least one selected from the group consisting of content, a shape and a size. Hence, the preview image displayed by the portable device 10 when the flip cover is in the closed position is defined as a first preview image and the preview image displayed by the portable device 10 when the flip cover is in the open position can be defined as a second preview image.

The portable device 10 can store a digital image 73 based on the second preview image displayed in a position where the flip cover is opened.

Figure 8:
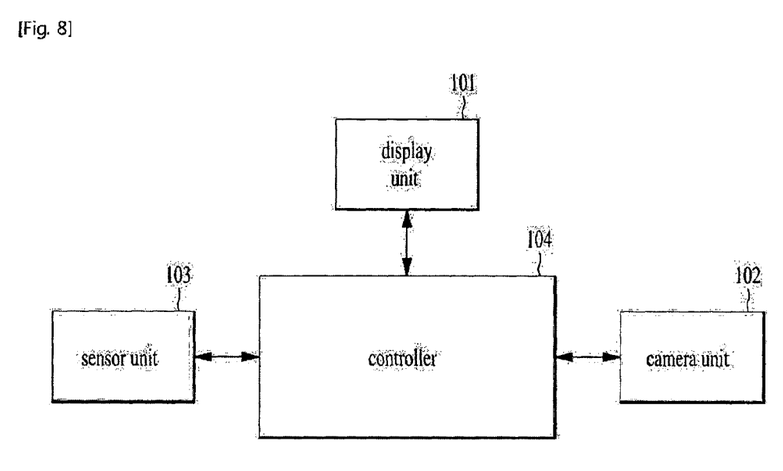
FIG. 8 is a block diagram of a portable device according to one embodiment of the present specification.

FIG. 8 is a block diagram of a portable device according to one embodiment of the present specification. The portable device can include a display unit 101, a camera unit 102, a sensor unit 103, and a controller 104. In addition, the portable device can further include a removable flip cover.

The display unit 101 can display a digital image. As mentioned earlier in FIG. 4 to FIG. 7, the display unit 101 can display preview images different from each other according to whether the flip cover is opened or not. And, the display unit 101 can display preview images different from each other based on at least one of a size and a shape of an open window of the flip cover. The display unit 101 can display a first preview image or a second preview image according to whether the flip cover is opened or not. The display unit 101 can detect a control input of a user. The portable device can transmit a signal for activating the camera unit or display predetermined information in response to the control input.

According to embodiment, the display unit 101 can include at least one selected from the group consisting of light-emitting diode (LED), organic light-emitting diode (OLED), liquid crystal display (LCD), E-ink, and a flexible display. The display unit can include a touch sensitive display unit and can detect a control input touching the display unit.

The camera unit 102 can take a picture of a digital image by sensing an external object. In the present specification, if the portable device operates in the landscape mode in a state that the flip cover is positioned in the closed position, the camera unit 102 can be activated when a first control input is inputted. The activated camera unit can display the sensed external object image in the display unit as a preview image. If a second control input for taking a picture of a digital image is inputted, the camera unit can take a picture of the digital image and store the digital image.

The sensor unit 103 can include an input sensor unit configured to sense a control input inputted to the portable device, a cover sensor unit configured to sense whether the flip cover is opened or not, an orientation sensor unit configured to sense an orientation of the portable device, and a distance sensing unit configured to sense a distance to a subject.

The input sensor unit can sense a control input inputted to the portable device. The input sensor unit can sense a control input touching the display unit. The input sensor unit can sense a control input of a user using a resistive or a capacitive touch sensor. The aforementioned display unit 101 and the input sensor unit can be designed in a manner of being integrated into a touch sensitive display unit according to embodiment. According to embodiment, the input sensor unit can include an illumination sensor, a physical button, a camera or a proximity sensor and can sense a control input using the same. Moreover, the input sensor unit may include a mechanical vibration sensor sensing a control input for tapping the portable device.

The cover sensor unit can detect whether the flip cover is opened or not. The cover sensor unit can detect whether the flip cover is positioned in an open position or a closed position.

The orientation sensor unit can sense an orientation of the portable device. If a first orientation is sensed, the orientation sensor unit can set the portable device to a portrait mode. And, if a second orientation is sensed, the orientation sensor unit can set the portable device to a landscape mode. As mentioned earlier in FIG. 2, the portable device can display predetermined information or activate the camera unit according to a sensed orientation.

The distance sensor unit can measure a distance to a subject or an external object captured by the camera unit. The portable device can determine whether to activate the camera unit according to a measurement result measured by the distance sensor unit.

The sensor unit 103 can deliver sensed information to the controller 104.

The controller 104 can control the display unit 101 and the camera unit 102 using the information delivered from the sensor unit. The controller 104 can detect an orientation of the portable device in a standby mode. If the portable device is gripped in a horizontal direction, the controller 104 can detect a second orientation. Having detected the second orientation, the controller 104 can set the portable device to a landscape mode.

If the flip cover is positioned in the closed position, the second orientation is sensed, and a control input is inputted in the standby mode, the controller 104 can activate the camera unit. The controller 104 can detect the control input via an area exposed to external by the open window among the display unit of the portable device. And, according to embodiment, the controller 104 can detect the control input via at least one selected from the group consisting of a physical button, the display unit, a mechanical vibration sensor, a microphone, and a sensor unit included in the portable device. The control input may correspond to a touch input touching the portable device or an input patting the portable device twice. And, the control input may include a gesture input or an audio input according to embodiment. As mentioned in the foregoing description, the controller 104 can directly activate the camera unit by the control input only in the standby mode. In particular, a user can take a picture of a digital image by activating the camera in a state that the flip cover is positioned in the closed position.

The controller 104 can display a preview image of a digital image sensed by the camera unit. The controller 104 can display the preview image in a display area corresponding to the open window. In particular, although the flip cover is positioned in the closed position, the controller 104 can provide the preview image displayed in the display unit to a user via the open window. The controller 104 can display the digital image sensed by the camera unit as the preview image in a manner of cropping or resizing the digital image. And, in case of displaying the cropped preview image, the controller 104 can take a picture of the digital image after increasing a resolution value set to the camera unit. By doing so, in case of taking a picture of the digital image corresponding to the cropped preview image, the controller 104 can store the digital image without a deterioration of resolution.

FIG. 8 is a block diagram according to one embodiment of the present specification. Blocks represented as being separated are depicted for elements of the portable device in a manner of being logically distinguished. Thus, the aforementioned elements of the portable device may be equipped with a single chip or a plurality of chips according to a design of the portable device.

Figure 9:
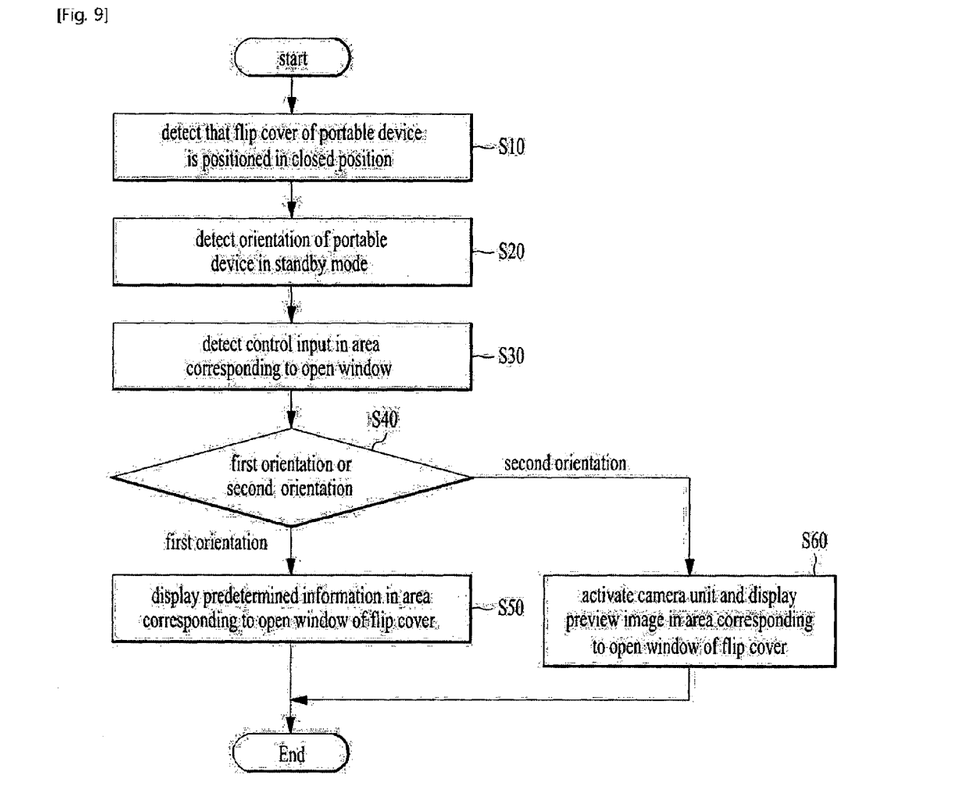
FIG. 9 is an operation flowchart of a portable device according to one embodiment of the present specification.

FIG. 9 is an operation flowchart of a portable device according to one embodiment of the present specification. The portable device can detect that the flip cover is positioned in the closed position [S10]. As mentioned earlier in FIG. 1, the portable device can detect whether the flip cover is opened or not using the cover sensor unit. Having detected that the flip cover is positioned in the closed position, the portable device can detect that an area corresponding to the open window of the flip cover among the display area of the portable device is exposed to external.

The portable device can detect an orientation of the portable device in the standby mode [S20]. As mentioned earlier in FIG. 2, the portable device can detect the orientation of the portable device via the orientation sensor unit. If the portable device is gripped in a vertical direction by a user, the portable device detects a first orientation. If the portable device is gripped in a horizontal direction, the portable device can detect a second orientation. If the first orientation is detected, the portable device can be set to the portrait mode. If the second orientation is detected, the portable device can be set to the landscape mode.

The portable device can detect a control input in the display area corresponding to the open window [S30]. If the flip cover is positioned in the closed position, the display unit of the portable device can be covered with the flip cover. Hence, the display unit of the portable device is not exposed to the external and a user cannot check the display unit by vision. Yet, in case that the flip cover includes an open window, the area corresponding to the open window among the display area of the portable device can be exposed to the external. Hence, the portable device can detect a control input via the display area corresponding to the open window. According to embodiment, the portable device may detect the control input using such a different sensor unit as a physical button, a microphone, a proximity sensor, an illumination sensor, a camera, or the like.

The portable device can determine whether a detected orientation corresponds to the first orientation or the second orientation [S40]. The portable device can differently operate for an identical control input according to a result detected by the orientation unit.

If the first orientation is determined, the portable device can display predetermined information in the display area corresponding to the open window of the flip cover [S50]. If the first orientation and a control input are detected in the standby mode, the portable device can display the predetermined information. The predetermined information can include at least one selected from the group consisting of information on current time, quick control information for executing an application, and user information. The predetermined information can be displayed in the display area corresponding to the open window. In particular, although the flip cover is positioned in the closed position, the portable device can provide the information displayed in the display unit to a user via the open window.

If the second orientation is determined, the portable device activates the camera unit and can display a preview image in the area corresponding to the open window of the flip cover [S60]. If the second orientation and a control input are detected in the standby mode, the portable device can activate the camera unit. In particular, a user can take a picture of a digital image in a manner of activating the camera in a state that the flip cover of the portable device is positioned in the closed position.

If the second orientation is sensed, the portable device can operate in the landscape mode. If a control input is inputted in the landscape mode, the portable device can activate the camera unit. The portable device can display a preview image of a digital image sensed via the camera unit. The portable device can display the preview image in the display area corresponding to the open window. In particular, although the flip cover is positioned in the closed position, the portable device can provide the preview image displayed in the display unit to a user via the open window. The portable device can display the digital image sensed by the camera unit as the preview image in a manner of cropping or resizing the digital image. And, in case of displaying the cropped preview image, the portable device can take a picture of the digital image after increasing a resolution value set to the camera unit. By doing so, in case of taking a picture of the digital image corresponding to the cropped preview image, the portable device can store the digital image without a deterioration of resolution.

As mentioned in the foregoing description, although an identical control input is detected by the portable device, the portable device can differently operate according to whether the portable device operates in the portrait mode or the landscape mode. In particular, if the portable device detects a control input in the portrait mode, the portable device displays information. If the portable device detects a control input in the landscape mode, the portable device activates the camera unit and can take a picture of a digital image. By doing so, although the flip cover is positioned in the closed position, the portable device can immediately provide a photo capturing. In particular, a user can take a picture of a digital image without opening the flip cover of the portable device.

Figure 10:
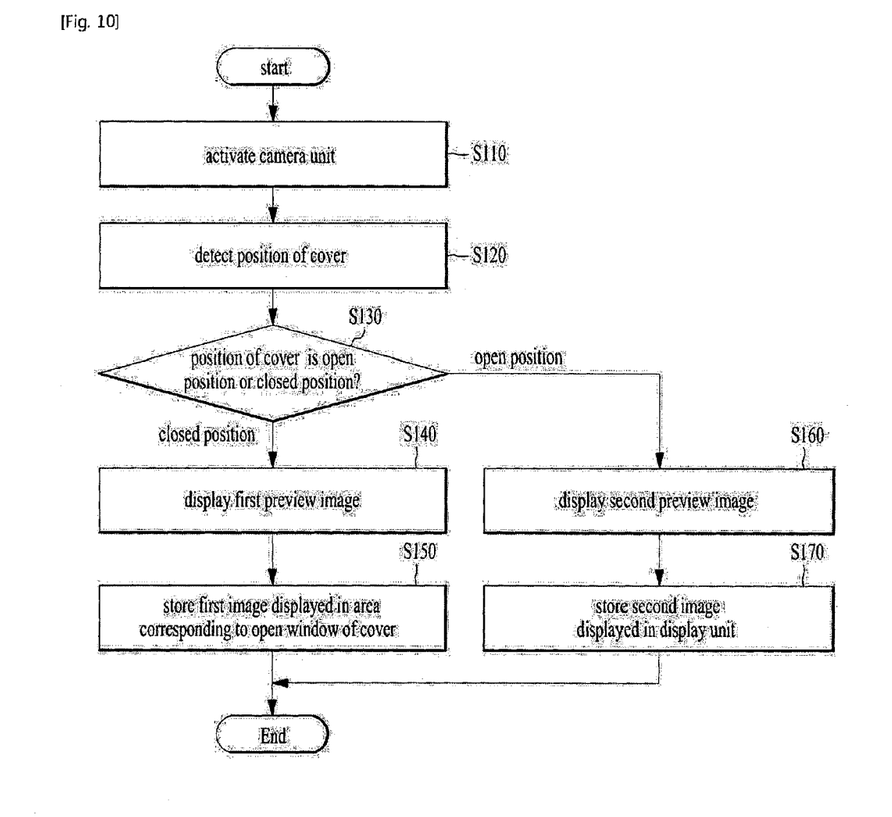
FIG. 10 is a flowchart for a portable device according to one embodiment of the present specification to display a preview image and store a digital image.

FIG. 10 is a flowchart for a portable device according to one embodiment of the present specification to display a preview image and store a digital image. The portable device can activate the camera unit [S110]. As mentioned earlier in FIG. 2, if the flip cover is positioned in the closed position and a control input is inputted in landscape mode, the portable device can activate the camera unit.

The portable device can detect a position of the flip cover [S120]. As mentioned earlier in FIG. 4 to FIG. 7, the portable device can detect the position of the flip cover after the camera unit is activated as well. The portable device can detect the position of the flip cover using the cover sensor unit.

The portable device can determine whether the position of the flip cover corresponds to an open position or a closed position [S130]. The portable device can differently configure a preview image to be displayed according to the position of the flip cover. In particular, the controller of the portable device can determine the position of the flip cover based on information delivered from the cover sensor unit.

If the flip cover is positioned in the closed position, the portable device can display a first preview image [S140]. As mentioned earlier in FIG. 4 to FIG. 6, if the flip cover is positioned in the closed position, among the display area of the portable device, an area corresponding to the open window of the flip cover can be limitedly exposed to external. Hence, the portable device can display the first preview image based on at least one selected from the group consisting of a position, a shape, and a size of the open window. The portable device can display the first preview image in a manner of resizing or cropping a digital image sensed by the camera unit.

The portable device can store a first digital image based on the first preview image displayed in the area corresponding to the open window of the flip cover [S150]. If the first preview image corresponds to a result of resizing, the portable device can store a digital image sensed by the camera unit as the first digital image. On the contrary, if the first preview image corresponds to a result of being cropped, the portable device can selectively store an area corresponding to the first preview image among the digital image sensed by the camera unit as the first digital image. Hence, the portable device can store a digital image including an angle of view and content identical to those of the first preview image as the first digital image.

If the flip cover is positioned in the open position, the portable device can display a second preview image [S160]. As mentioned earlier in FIG. 7, if the flip cover is positioned in the open position, the portable device can display a digital image sensed by the camera unit in the display unit as the second preview image without modifying the digital image. Although the flip cover moves from the closed position to the open position, the portable device can display the second preview image of the digital image sensed by the camera unit in the display area. When the flip cover is positioned in the closed position, the portable device displays a preview image in a selective display area corresponding to the open window. On the contrary, if the flip cover is positioned in the open position, the portable device can display the second preview image in the whole of the display area.

The portable device can store a second digital image based on the second preview image displayed in the display unit [S170]. The portable device can store the whole area of the digital image sensed by the camera unit as the second digital image.

As mentioned in the foregoing description, the portable device according to the present specification can differently operate for an identical control input according to an orientation of the portable device and whether the flip cover is opened or not. The portable device according to the present specification can activate the camera unit, check a preview image, and store a digital image even though the flip cover is positioned in the closed position.

Mode for the Invention

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

As described above, the present invention is totally or partially applicable to electronic devices.

The invention claimed is:

1. A portable device, comprising:
a camera unit configured to sense a digital image;
a display unit configured to display the digital image;
a cover sensor unit configured to sense whether a flip cover is opened or not, wherein the flip cover contains an open window and wherein the open window exposes a first part of the display unit when the flip cover is positioned in a closed position;
an orientation sensor unit configured to sense an orientation of the portable device; and
a controller configured to control the camera unit, the display unit, the cover sensor unit, and the orientation sensor unit,
wherein the controller is further configured to:
detect a first control input when the portable device operates in a standby mode and the flip cover is positioned in the closed position,
display predetermined information in the first part of the display unit when the orientation of the portable device corresponds to a first orientation,
when the orientation of the portable device corresponds to a second orientation, activate the camera unit in response to the first control input and display a first preview image of the digital image sensed by the camera unit in the first part of the display unit,
detect a second control input for taking a picture of the digital image, and
selectively store an area displayed in the first part of the display unit among the digital image sensed by the camera unit.

2. The portable device of claim 1, wherein the first orientation corresponds to a portrait mode of the portable device and wherein the second orientation corresponds to a landscape mode of the portable device.

3. The portable device of claim 1, wherein the predetermined information corresponds to information on a current time.

4. The portable device of claim 1, wherein the first preview image is generated by resizing the digital image according to at least one selected from the group consisting of a position, a shape, and a size of the first part of the display unit.

5. The portable device of claim 1, wherein the first preview image is generated by cropping the digital image according to at least one selected from the group consisting of a position, a shape, and a size of the first part of the display unit.

6. The portable device of claim 5, wherein the controller is further configured to take a picture after increasing a resolution of the camera unit when the first preview image is generated by cropping the digital image.

7. The portable device of claim 1, wherein the controller is further configured to store a whole area of the digital image sensed by the camera unit when the first preview image is generated by resizing the digital image.

8. The portable device of claim 1, wherein the controller is further configured to store a part of cropped area among the digital image sensed by the camera unit when the first preview image is generated by cropping the digital image.

9. The portable device of claim 1, wherein the controller is further configured to switch the first preview image to a second preview image and display the second preview image when the flip cover moves to an open position after the first preview image is displayed in the first part of the display unit.

10. The portable device of claim 9, wherein the controller is further configured to display the second preview image in a whole area of the display unit.

11. The portable device of claim 9, wherein the second preview image comprises a whole area of the sensed digital image.

12. The portable device of claim 9, wherein the controller is further configured to:
detect a second control input for taking a picture of the digital image; and
store the digital image in response to the second preview image displayed in the display unit.

13. The portable device of claim 1, wherein the controller is further configured to switch the portable device to an active mode when the flip cover is positioned in an open position, and wherein the controller is configured to switch the portable device to the standby mode when the flip cover is positioned in the closed position.

14. The portable device of claim 1, further comprising a touch sensor unit,
wherein the controller is further configured to detect a touch input for the first part of the display unit as the first control input when the flip cover is positioned in the closed position.

15. The portable device of claim 14, wherein the controller is further configured to limit a touch sensitive area of the display unit to the first part when the flip cover is positioned in the closed position.

16. The portable device of claim 1, wherein the controller is further configured to:
sense a gravity orientation via the orientation sensor unit,
activate the camera unit only when an angle between the display unit of the portable device and the gravity orientation is within an angle threshold, and
maintain the activated state of the camera unit although the angle between the display unit and the gravity orientation exceeds the angle threshold when the camera unit is activated.

17. The portable device of claim 1, further comprising a distance sensor unit configured to measure a separation distance between the portable device and an external object,
wherein the controller is further configured to measure the separation distance between the portable device and the external object and activate the camera unit only when the separation distance is greater than a distance threshold.

18. The portable device of claim 1, wherein the second orientation is orthogonal to the first orientation relative to a vector that is orthogonal to a display area of the display unit.

19. A method of controlling a portable device containing a flip cover for covering a display unit, the method comprising:
detecting that the portable device operates in a standby mode and the flip cover is positioned in a closed position, wherein the flip cover contains an open window and wherein the open window exposes a first part of the display unit when the flip cover is positioned in a closed position;
sensing an orientation of the portable device;
detecting a first control input;
displaying predetermined information in the first part of the display unit when the orientation of the portable device corresponds to a first orientation;
when the orientation of the portable device corresponds to a second orientation, activating the camera unit in response to the first control input and displaying a preview image of the digital image sensed by the camera unit in the first part of the display unit;
detecting a second control input for taking a picture of the digital image; and
selectively storing an area displayed in the first part of the display unit among the digital image sensed by the camera unit.

20. The method of claim 19, wherein the second orientation is orthogonal to the first orientation relative to a vector that is orthogonal to a display area of the display unit.

* * * * *